United States Patent

[11] 3,625,555

| [72] | Inventors | Robert J. Scott<br>Blue Springs, Mo.;<br>Leo F. Aberer, Shawnee Mission, Kans. |
|---|---|---|
| [21] | Appl. No. | 869,203 |
| [22] | Filed | Oct. 24, 1969 |
| [45] | Patented | Dec. 7, 1971 |
| [73] | Assignee | Rival Manufacturing Company<br>Kansas City, Mo. |

[54] SPLIT NUT FOR HOUSEHOLD APPLIANCES
4 Claims, 9 Drawing Figs.

[52] U.S. Cl. .................................................. 287/111, 85/33
[51] Int. Cl. .................................................. F16d 1/00
[50] Field of Search .......................................... 287/111; 85/33; 285/419, 34, 373

[56] References Cited
UNITED STATES PATENTS

| 146,895 | 1/1874 | Flynn | 285/373 |
| 663,208 | 12/1900 | Wrensch | 85/33 |
| 937,364 | 10/1909 | Dolder | 85/33 UX |
| 1,315,995 | 9/1919 | Shoup et al. | 85/33 UX |
| 1,366,884 | 1/1921 | Nahrung | 85/33 |
| 1,369,913 | 3/1921 | Brunhoff | 287/111 X |

*Primary Examiner*—Andrew V. Kundrat
*Attorney*—Scofield, Kokjer, Scofield & Lowe ABSTRACT: A split nut for household products such as electrically operated blenders has two 180 halves which are hingedly connected at one end and releasably connected at the other. The externally ribbed halves are threaded for connection with the blender base and permits same to be fixedly attached to the blender power unit. An annular lipped structure below the threads cooperates with the releasable connection to facilitate in an easy removal of the split nut from the blender base.

PATENTED DEC 7 1971

Robert J. Scott
Leo F. Aberer
INVENTORS.

BY

ATTORNEYS

PATENTED DEC 7 1971 3,625,555

Robert J. Scott
Leo F. Aberer
INVENTORS.

BY
Scofield, Lohjer, Scofield & Lowe
ATTORNEYS

SPLIT NUT FOR HOUSEHOLD APPLIANCES

BACKGROUND AND BRIEF DESCRIPTION OF THE INVENTION

The subject invention is particularly designed for the use with electric blenders and facilitates the removal of the base nut which is threadably attached to the base of the blender container. As is predictable with household equipment that comes in contact with food products, the cutting, slicing or blending elements associated therewith should be submerged in water or a cleaning solution after use in order to maintain same completely sanitary. Since an electric blender having a solid base with a nondetachable cutting element is extremely hard to get at for washing purposes, blenders with a removable base construction that permit the easy disassembly of the blender cutting blades and power attachment have proven to be much more convenient insofar as the ability to clean and to sanitize is concerned. There is, however, the problem of the base nut utilized with such blenders in that it tends to become very difficult for ladies to remove, once having been tightly reassembled or threadably attached to the blender container.

Our invention utilizes the basic blender nut design but has divided same into two 180° halves which are hingedly connected at one end portion and which utilize either a pushbutton or a toggle-type latch to permit the nut to split for easy removal from the blender container base.

The first embodiment of our invention utilizes the spring loaded pushbutton that is mechanically linked to an arcuate pivot band located on an inner annularly extending lip. Depressing the pushbutton, frees an associated flange from a locking notch and exerts an outward thrust against the inner portion of the locked nut via the pivot band so that the two 180° halves move apart on the articulating hinge.

The second embodiment interconnects the nonhinged end portion of the two 180° halves by a toggle mechanism so that when closed, the two halves are united together forming a 360° unitary partially threaded nut. When the toggle is open, the halves are forced apart on the hinged end portions thereby permitting a more easy removal from the threaded connection of the nut with the blender container.

An object of the invention is to provide a uniquely constructed blender split nut which permits the easy removal of same from the blender container.

Another object of the invention is to provide a split nut of the character described which utilizes a spring loaded pushbutton to separate two hingedly connected 180° split nut halves thereby facilitating the easy removal of same from a blender container.

Another object of the invention is to provide a uniquely constructed split nut for use with blender containers that includes a toggle connection for controlling the position of two 180° hingedly connected halves.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith, and in which like reference numerals are employed to indicate like parts in the various views.

Figure 1:
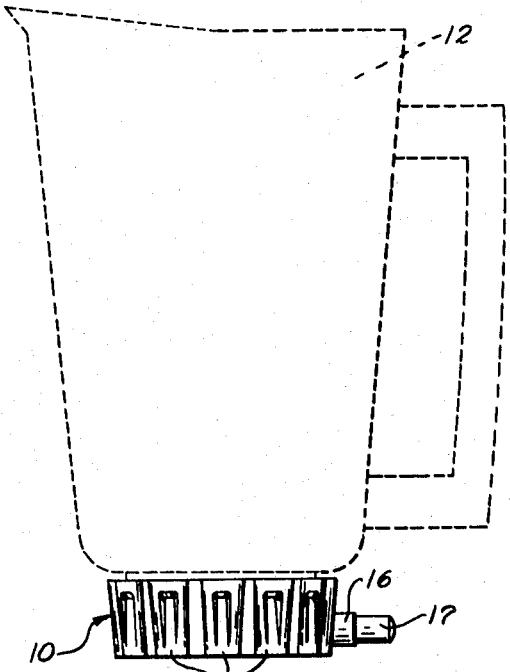
FIG. 1 is an elevational view of the pushbutton operated split nut with the blender container shown in broken lines.
Figure 2:
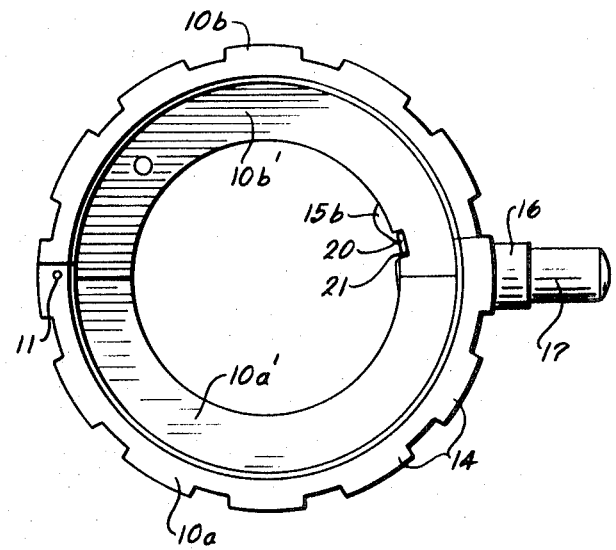
FIG. 2 is an enlarged bottom elevational view of the split nut shown in FIG. 1.
Figure 4:
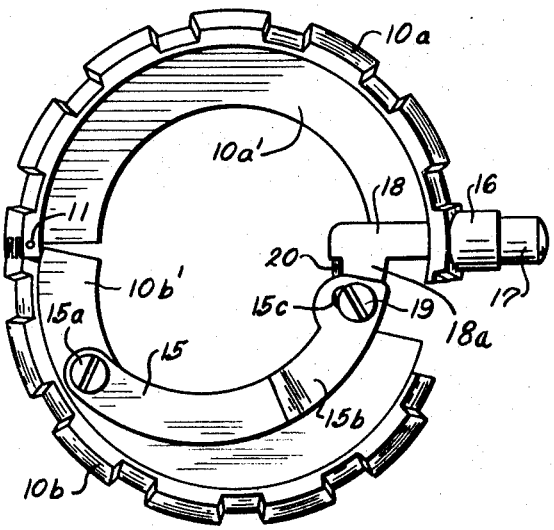
FIG. 4 is a view similar to FIG. 5, however, showing the pushbutton depressed and the two 180° halves separated at one end thereof.
Figure 3:
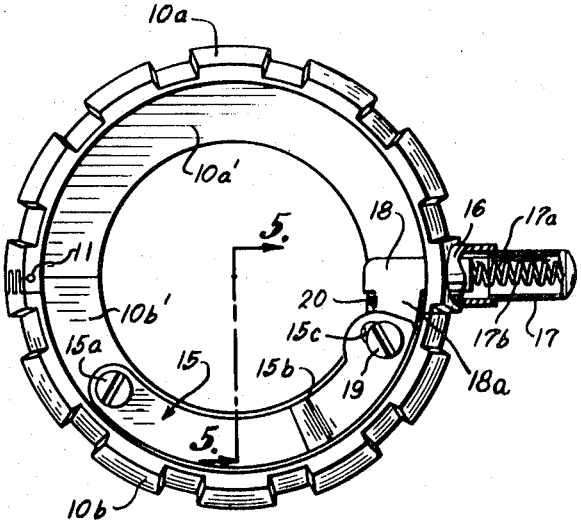
FIG. 3 is a top elevational view of the split nut shown in FIG. 2.
Figure 5:
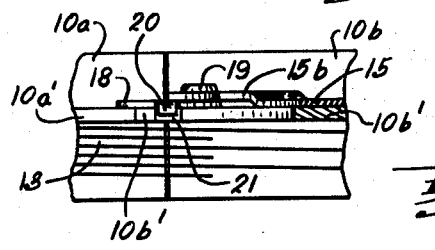
FIG. 5 is a sectional view taken substantially along the line 5—5 of FIG. 3 in the direction of the arrows.

Turning now more particularly to the drawings, the first embodiment of the invention is shown in FIGS. 1 through 5. Reference numeral 10 generally represents the externally ribbed pushbutton operated split nut, same being comprised of 180° halves 10a and 10b. The halves are hingedly connected together at the left-end portions thereof, as seen in FIGS. 2–4, by hinge pin 11 which extends through overlapping mating ends of the two halves.

As suggested above, one function of the split nut is to attach the base of a blender container 12 to a suitable power unit. Accordingly, a portion of the split nut hereinafter identified by the numeral 13 is internally threaded to facilitate the above-mentioned interconnection. Annular lips 10a' and 10b' extend from halves 10a and 10b respectively and lie in substantially the same horizontal plane. With the split nut in the closed position as shown in FIGS. 2 and 3, the end extremity of the base of the blender container 12 will contact the upper surface of the lips 10a' and 10b' when the split nut is tightly screwed thereon.

Since conventional power units have four or more rubber fingers extending upwardly from same, the external ribs, generally shown by the numeral 14, contact the fingers and fixedly locate the nut (and the blender container) so that only the blades (not shown) within the container rotate.

An arcuately shaped pivot band 15 is disposed on the usual underside of lip 10b'. Pivot band 15 is pivotally secured to lip 10b' by screw 15a so that it may assume either one of the solid line positions shown in FIGS. 3 and 4. The band has a raised portion 15b with an oval slot 15c formed near the end extremity thereof.

A pushbutton housing in the form of an annular collar 16 extends outwardly from nut half 10a and slidably receives pushbutton 17 therein. Flat shank 18 extends through a rectangular opening in the inner wall of half 10a interiorly of collar 16 and abuts against the inner end or is received within a counter bore 17a of pushbutton 17. A compression spring 17b is located between shank 18 and the pushbutton or the pushbutton counter bore. Shank 18 has a lug 18a extending transversely to the longitudinal center line of the shank and located above the upper surface of lips 10a' and 10b' but below the lower surface of the raised portion 15b of pivot band 15. Screw 19 extends through the oval opening 15c and is threadably engaged within an internally threaded opening in the lug 18a of shank 18.

A locking flange 20 is turned to extend toward the nut axis and is substantially normal to the principal horizontal plane of shank 18 and lug 18a. The flange 20 is located and sized so that it may be engaged within a suitably sized slot 21 located in lip 10b'. As shown in FIG. 2, the normal action of spring 17b is to withdraw shank 18 within collar 16 so that when the nonhinged ends of lips 10a' and 10b' are contacting each other, flange 20 is located within locking slot 21, thereby precluding any articulating motion of the halves 10a and 10b on hinge pin 11 and permitting the threaded portion of the locking nut to firmly engage the base of blender container 12.

When it is desired to remove the split nut from the base of the blender container, pushbutton 17 is depressed against spring 17b so as to force shank 18 to move exteriorly of collar 16 and away from the inner surface of half 10a. This pushbutton action moves the screw 19 within oval slot 15c. Eventually, this movement will result in flange 20 exiting from locking slot 21 and in screw 19 contacting the innermost edge of oval slot 15c so that force is transmitted via pivot bank 15 to lip 10b' via screw 15a. Again, note that screw 15a engages lip 10b' forwardly (relative to the pushbutton) and laterally away from hinge pin 11. With flange 20 no longer locking the nonhinged ends of the nut halves together, the resultant force swings half 10b about hinge pin 11 thereby substantially increasing the diameter of the split nut and permitting easy removal from its threaded connection with the base of container 12.

When it is desired to reassemble the blender after the cutting elements or the container has been completely submerged and washed, it is merely necessary to manually force both halves together so that flange 20 is located above slot 21. Spring 17b will bias shank 18 toward the collar 16 so that flange 20 will return to its locking position within slot 21 and the split nut is once again ready for operation and attachment with the blender container.

Figure 9:
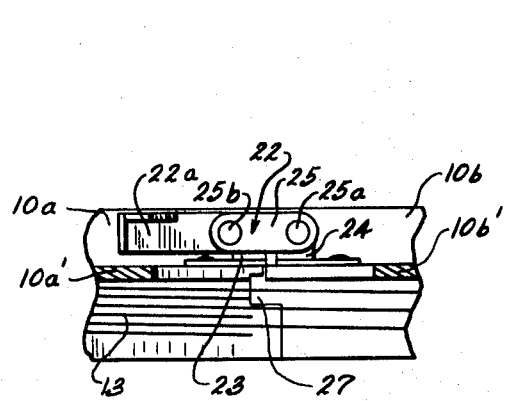
FIG. 9 is a sectional view taken generally along the line 9—9 of FIG. 8 in the direction of the arrows.
Figure 6:
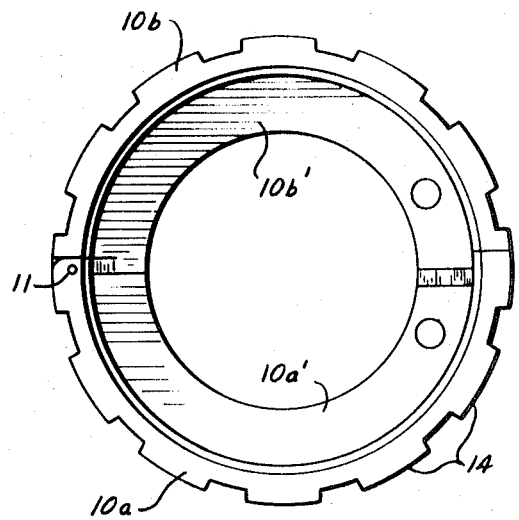
FIG. 6 is a bottom elevational view of the second embodiment of the invention and similar to that shown in FIG. 2.
Figure 8:
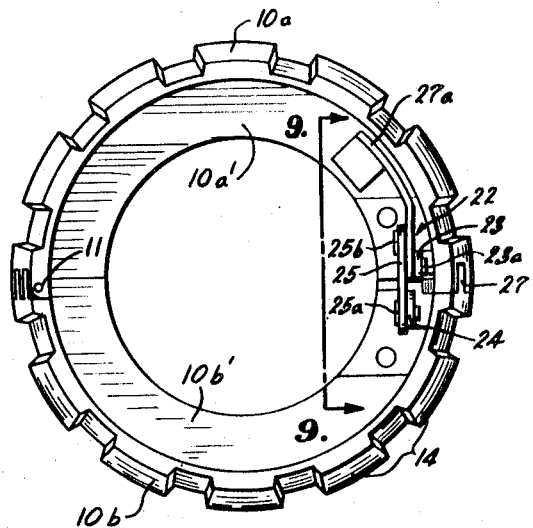
FIG. 8 is a view similar to FIG. 7 with the toggle connection closed.

The second embodiment of the invention is shown in FIGS. 6 and 9 and has a basic structure somewhat similar to the first embodiment in that same includes the two 180° halves 10a and 10b which are hingedly connected by hinge pin 11 as described above. The opposite ends of the nut halves are releasably connected by a toggle arrangement generally indicated by the numeral 22. As shown in FIG. 8, with the toggle mechanism contracted, the split nut is closed to form a blender container engaging structure that facilitates the mounting of same on the blender power unit. Internal threads 13 are again present above the annularly extending lips 10a' and 10b' to facilitate the above-mentioned utilization of the nut.

Figure 7:
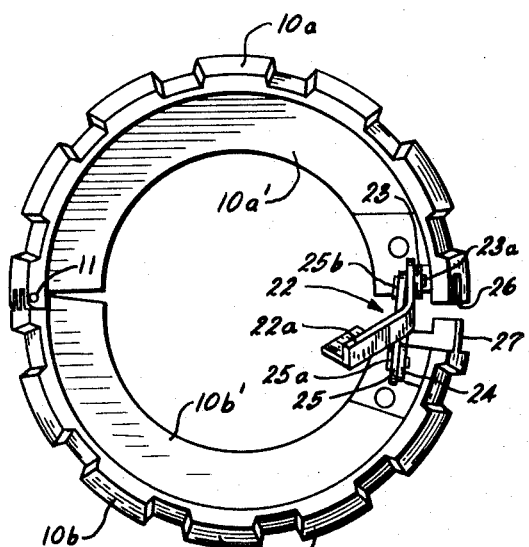
FIG. 7 is a top plan view of the split nut shown in FIG. 6 with the toggle moved to separate one end of the two 180° halves of the split nut.

As best seen in FIGS. 7, 8 and 9, the toggle is supported from two upright lugs 23 and 24 which are fixedly attached to lips 10a' and 10b' respectively. A link 25 is pivotally mounted on lug 24 by a stud 25a which extends through aligned apertures in both the link and the lug. The lever arm 22a of the toggle is pivotally attached to the upper portion of the lug 23 by stud 23a. Link 25 is further attached to lever 22a by stud 25b to permit the pivotal movement of the link with respect to lever 22a but which will cause the link to follow the arcuate path of the lever as it is pivoted on stud 23a.

The above-mentioned structure provides for the opening and closing of the nonhinged end portions of the nut halves 10a and 10b. As seen in FIG. 7, with lever 22a moved upwardly and to the left on its pivot pin (stud 23a), link 25 follows the upward movement of the lever 22a until the distance between studs 25a and 23a is exceeded by the effective length of link 25. When this occurs, the swinging motion of lever 22a forces line 25 upwardly and outwardly, causing the two halves to separate as the toggle opens (see FIG. 7).

The above-mentioned toggling of lever 22a and link 25 and the separation of halves 10a and 10b increase the diameter of the split nut sufficiently to permit an easy removal of the nut from the base of the blender container. The split nut is easily returned to its operative configuration by contracting the toggle e.g. swinging lever 22a in a direction to occupy the position shown in FIG. 8. Lever movement in the aforesaid direction pulls link 25 in a direction to close the two halves 10a and 10b.

With the toggle mechanism constructed to facilitate the opening and the closing of the split nut, nut half 10a has a notch 26 located therein which is sized to mate with a tongue projection 27 which extends from half 10b. It follows, therefore, that with the toggle closed as shown in FIG. 8, the notch and tongue (26 and 27 respectively) mate and preclude any inadvertent vertical skewing of the nut halves which could possibly cause the toggle to move sufficiently to separate the two halves.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A split nut for blender containers, said split nut comprising
    two 180° halves, each half having first and second end portions with a substantially 180° bend therebetween, each half having at least a portion thereof which is internally threaded,
    means for hingedly connecting the two halves at the first end portion of each half,
    means for releasably connecting the second end portions of said halves thereby permitting said split nut to threadably engage a like portion of said blender container and to support same for operation with a blender power unit when said second end portions are connected, said releasable means including a mechanical linkage comprising first and second interconnecting members,
    means for attaching said first member to one of said halves,
    means for attaching said second member to the other of said halves,
    a pushbutton, said pushbutton mounted on one of said halves projecting exteriorly thereof, and
    means connected with said pushbutton and extending interiorly of said nut for engaging a portion of the other of said halves, said pushbutton operable to cause said engaging means to be released from the other of said halves when said pushbutton is depressed thereby permitting said diameter of said nut to be increased and said nut easily removed from said blender container.

2. The invention as in claim 1 wherein said halves each have an arcuate lip extending interiorly thereof in the same plane, a locking slot defined in one of said lips, said locking slot defining said engaged portion, said engaging means operable to locate within said locking slot and to preclude said first and second end portions connected by said releasably connecting means from separating until said pushbutton is depressed.

3. The invention as in claim 2 wherein said lip having said locking slot defined therein has a pivot band mounted thereon, said pivot band interconnecting with said engaging means and operable to transmit a pivoting force to its associated half causing said associated half to pivot away from the other half on said hinge means when said pushbutton is depressed.

4. The invention as in claim 3 wherein said engaging means includes a shank interconnected with said pushbutton, a compression spring, said compression spring located between said shank and said pushbutton, said spring operable to be compressed when said pushbutton is depressed, said shank having a portion thereof connected with an end portion of said pivot band said shank further having a flange extending substantially normal therefrom said flange operable to be engaged within said locking slot when said pushbutton is not depressed, and said pushbutton operable to move said flange out of said locking slot when depressed and to apply said pivoting force upon said pivot band so that said halves separate.

* * * * *